INVENTOR.
HEINRICH WEISEL

May 19, 1970     H. WEISEL     3,512,849
BALL BEARING FOR LINEAR MOTION

Filed Jan. 19, 1968     2 Sheets-Sheet 2

INVENTOR.
HEINRICH WEISEL
BY
Morgan, Finnegan, Durham & Pine
ATTORNEYS

United States Patent Office
3,512,849
Patented May 19, 1970

3,512,849
BALL BEARING FOR LINEAR MOTION
Heinrich Weisel, 17 Haardtweg, 8729 Zeil (Main),
Schweinfurt, Germany
Filed Jan. 19, 1968, Ser. No. 699,070
Int. Cl. F16c 17/00
U.S. Cl. 308—6                                1 Claim

ABSTRACT OF THE DISCLOSURE

A linear ball bearing construction wherein the ball retainer is formed as a single, integral unit from a resilient, non-metallic material. Provision is made in the retainer for the attachment of a rigid, load-carrying plate to the portion of each of the raceways in which the balls directly contact the shaft on which the bearing is mounted. The load-free portion of each of the raceways surrounds the balls by more than 180° so as to retain and guide the balls in the raceway. A groove formed in the retainer about and closely adjacent to each side of the raceways permits rapid "snap-in" assembly and withdrawal of the balls and the load-carrying plate.

Background and objects of the invention

The present invention relates generally to ball bearings for linear motion, and relates more particularly to certain new and useful improvements in the retainer member for such ball bearings.

Ball bearings for linear motion in which the balls traverse continuous closed circuits have previously been proposed to meet the need for anti-friction sliding bearings but have generally suffered from a high manufacturing cost. This cost has been due, in part at least, to expensive methods of manufacture required, such as very accurate internal and external grinding, including the machining of areas of high-precision relief, fabrication of ball guiding and retaining parts, many of which must be made by hand or by super-precision machinery expensive to acquire and, in addition, to the amount of labor-time required to assemble the parts, insert the balls, fit the retainers into their proper places, and secure the assembled parts permanently in posititon.

It is therefore an object of the present invention to provide a new and improved linear ball bearing.

Another object of the present invention is to provide a new and improved linear ball bearing having a substantially reduced cost of manufacture over that heretofore available.

Another object of the present invention is to provide a new and improved linear ball bearing which is markedly reduced in weight over that heretofore available.

Another object of the present invention is to provide a new and improved linear ball bearing which is light in weight and yet capable of providing the rigidity of thick wall linear bearings of the type presently commercially available.

Another object of the present invention is to provide a new and improved linear ball bearing which is light in weight and yet has a greater load-carrying capacity than ball bearings heretofore available.

Objects and advantages of the invention are set forth in part herein and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

Summary of the invention

Briefly described, the present invention is embodied in a novel linear ball bearing of the type having a plurality of closed circuit raceways formed in a ball retainer, the raceways each having load-bearing and load-free portions, in which the ball retainer is formed as a single, integral unit from a resilient, non-metallic material. A rigid, preferably metallic, load-carrying plate is attached to the portion of each of the raceways in which the balls directly contact the shaft upon which the bearing is mounted. The load-free portions of the raceways surround the balls by more than 180° so as to retain and guide the balls in the raceway. Advantageously, the retainer is formed with a groove about and closely adjacent to each boundary edge of the raceways so as to facilitate "snap-in" insertion and withdrawal of the balls and load-carrying plate into and out of the retainer. The load-carrying plate is also advantageously attached to the retainer in a manner so as to prevent its axial movement therein. To this end, the plate is provided with tapered longitudinal edges having notches therein which engage with corresponding undercuts and tab projections in the retainer member.

It will be understood that the foregoing general description and the following detailed description as well are exemplary and explanatory of the invention but are not restrictive thereof.

The accompanying drawings, referred to herein and constituting a part hereof, illustrate one embodiment of the invention, and together with the description, serve to explain the principles of the invention.

Description of the preferred embodiment

Figure 1:
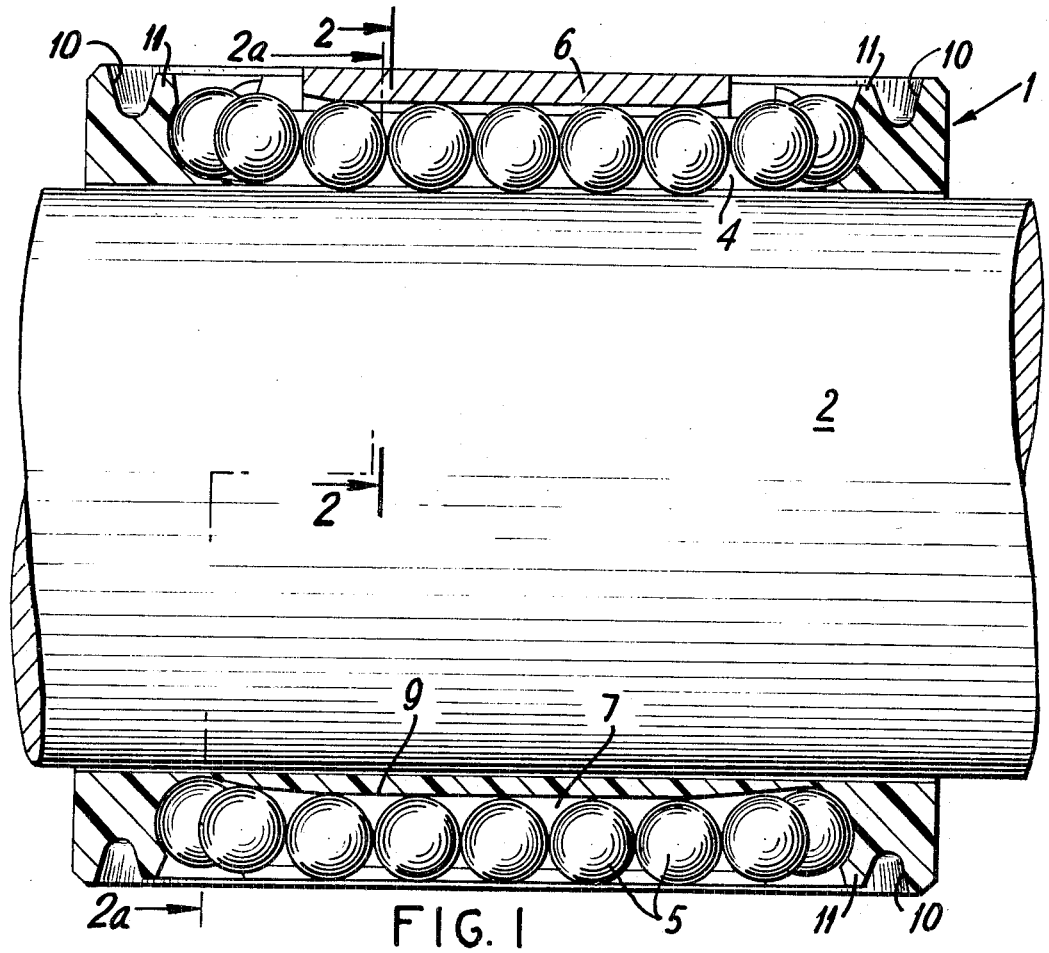
FIG. 1 is a view, partly in elevation and partly in longitudinal section, of a ball bearing assembly constructed in accordance with the invention, shown in operative relation about a shaft upon which it is mounted, the upper section illustrating the load-bearing portion of an individual raceway while the lower section illustrates that portion of an individual raceway in which the balls are load-free.

Referring now to the embodiment of the invention shown in the accompanying drawings, there is illustrated a cylindrical ball retainer 1, surrounding a round shaft 2, and having a plurality of generally oval-shaped raceways 3 formed therein, each being designated only generally by the foregoing reference numerals.

Figure 3:
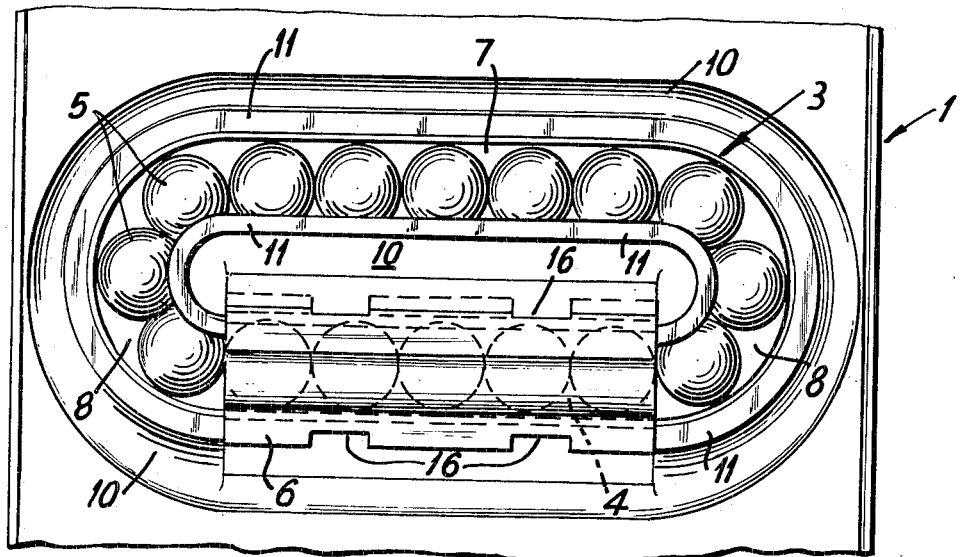
FIG. 3 is an enlarged, fragmentary view in top plan, taken in the direction of arrow D between line 3—3 of FIG. 2, illustrating an individual ball raceway of the bearing assembly of the invention.

As best seen in FIG. 3, each raceway 3 has a first straight, load-bearing portion 4 wherein the balls 5 are in direct bearing contact with both the shaft 2 and a load-carrying plate 6 and a further straight portion 7, wherein the balls 5 are out of contact with the shaft and are free of the load. The straight portions 4 and 7 are connected by a pair of curved portions 8, which permit the balls to pass freely from one straight portion of the raceway into the other according to the direction in which the load-carrying balls are impelled by the relative movement of the bearing and shaft.

In accordance with the invention, the ball retainer 1 is preferably formed as a single, integral unit from a resilient, non-metallic material. An example of a material which has been found to operate entirely satisfactorily is nylon, and it will be apparent that other resilient, non-metallic materials which are equivalent to nylon will operate equally satisfactory. Advantageously, the material is selected so that the retainer may be produced by low cost, high speed, mass manufacturing methods, such as injection molding.

Advantageously, and as here preferably embodied, the bottom of the straight, load-bearing portion 4 of each raceway 3 is slotted so that the balls 5 may contact the shaft 2, the slot being somewhat narrower than the diameter of the balls. The slot terminates at each end of the straight portion 4 whereupon the bottom is closed and is slightly inclined along the curved portion 8 of the raceway until it reaches the level of the bottom 9 of the straight, load-free portion 7 of the raceway. It will thus be seen that the balls 5 are in direct contact with both the shaft 2 and the load-carrying plate 6 when in the straight portion 4 of the raceway but have no contact with either the shaft 2 or the load while in the curved portions 8 or straight portion 7 of the raceway.

In accordance with the invention, the load-free portion 7 and the connecting portions 8, of each raceway 3, are shaped so as to encircle more than 180° of the circumference of the balls 5, whereby the top of these portions 7, 8 of the raceways is narrower than the ball diameter to thereby retain and guide the balls within the raceways and yet permit rapid "snap-in" insertion and withdrawal of the balls into and out of the retainer. The balls 5 are retained in the load-bearing portion 4 of each of the raceways by means of the load-carrying plate 6.

Figure 2:
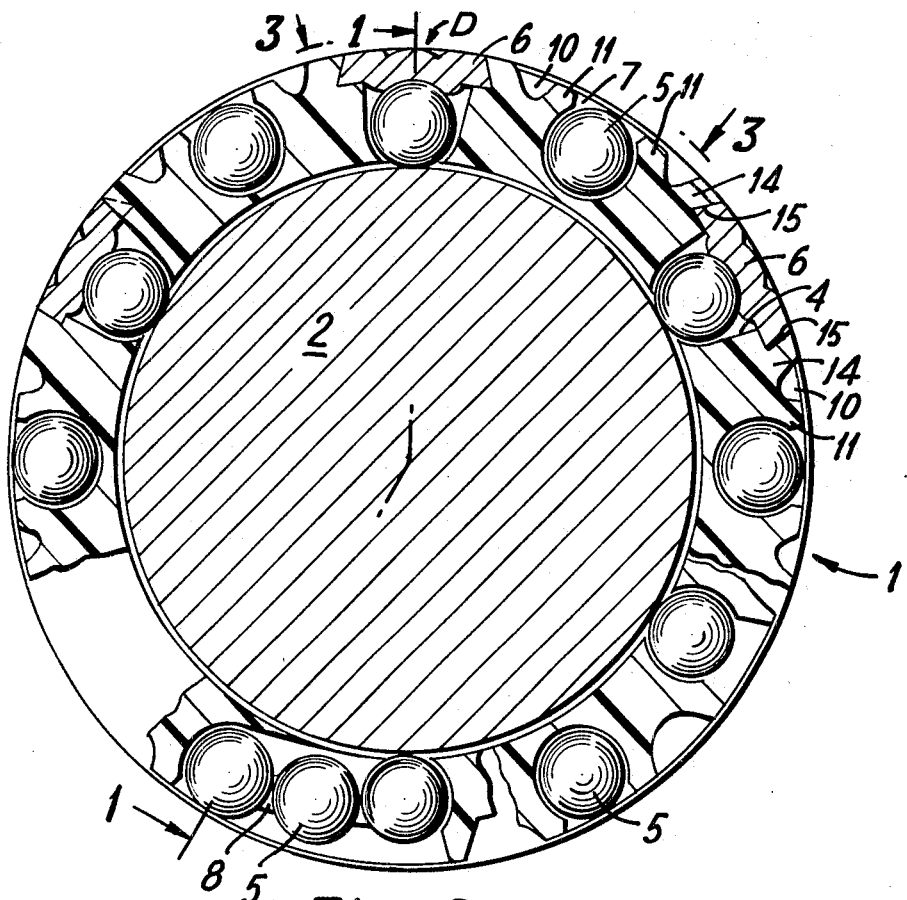
FIG. 2 is a fragmentary, transverse sectional view taken along lines 2—2 and 2a—2a of FIG. 1, partly in elevation, illustrating a series of ball raceways which extend longitudinally of the bearing at evenly spaced intervals about the shaft.

Advantageously, and as here preferably embodied, retainer 1 is formed so as to have grooves 10 closely adjacent to each edge of the raceways 3, to thereby form the boundary edges 11 of the raceway (FIG. 2), so as to facilitate the insertion and withdrawal of the balls 5 into and out of the raceway.

Figure 4:
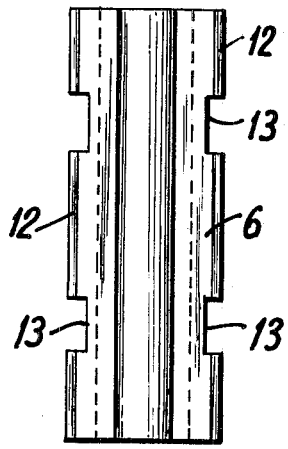
FIG. 4 is a view in top plan of the load-carrying plate which is mounted in the load-bearing portion of each raceway, the location of which is best seen in FIG. 3.

In accordance with the invention, means are provided for attaching a load-carrying plate to the load-bearing portion of each of the raceways 3 so as to prevent axial movement of the plate relative to the retainer, as well as to permit a slight radial movement of the plate, the latter facilitating a proper seating of the load plate in the housing bore (not shown). To this end, as best seen in FIG. 4, each plate 6 is provided with longitudinally extending tapered edges 12 and is also provided on its longitudinal edges with a pair of opposed notches 13. Similarly, the boundary edges 14 of the retainer 1 adjacent the portion 4 of the raceways are undercut at 15 so as to conform to the tapered edges 12 of the plate 6 and further include projecting tabs 16 for engaging the notches 13, thereby securely locating the plate in position and preventing relative axial movement between the plate and the retainer 1. It will also be seen that grooves 10 permit rapid "snap-in" insertion and withdrawal of the load-carrying plates, in the same manner as described in connection with the insertion and withdrawal of the balls 5 in the raceways.

It will thus be seen that the objects of the invention are accomplished in the embodiment illustrated and described in the present application. Thus, inasmuch as the balls and the load-carrying plates comprise the only metal used in the bearing structure, it will be seen that the ball bearing is extremely light in weight by comparison with ball bearings heretofore available. As the ball retainer is non-metallic, it may be manufactured by low cost, high speed, mass production techniques, such as, for example, injection molding. Similarly, the metal load-carrying plates may be produced rapidly and accurately at a very low cost by such manufacturing methods as stamping and swaging. Furthermore, despite the foregoing advantages of light weight and low cost manufacture, the ball bearing is capable of a rigidity equal to ball bearings presently available by virtue of the extremely rigid, thick wall, load-carrying plate. Moreover, as the load-carrying plate is held in position by resilient material it is permitted a small degree of radial movement which insures proper seating of the plate in the housing bore within which the bearing is mounted. Furthermore, the ball bearing of the present invention is capable of a greater load capacity than any ball bearings heretofore economically practical, in that the heavy duty, rigid, load-carrying plate may be economically fabricated with a ball conforming surface, the latter substantially increasing the load carrying capacity of the bearing.

The invention in its broader aspects is not limited to the specific embodiments herein shown and described but departures may be made therefrom within the scope of the accompanying claim, without departing from the principles of the invention and without sacrificing its chief advantages.

What is claimed is:

1. In a linear ball bearing for axial movement along a round shaft, said bearing having a plurality of raceways formed in a cylindrical ball retainer, and wherein each of said raceways has a load bearing portion and a load free portion interconnected at each end by a curved portion and is substantially filled with balls, the improvement therein which comprises: said cylindrical ball retainer being formed from a moldable material having elongated openings at the load bearing portions and a plurality of separate load carying plates extending from one end to the other of said load bearing portion and alined therewith and carried by said retainer in said openings and engaging means on said retainer and said load carrying plate for preventing axial and circumferential movement of said load carying plates relative to said retainer, said means also preventing excessive radial displacement of said plates with respect to said retainer while permitting slight radial displacement of said plates relative to said retainer whereby the load carrying plates may seat against a bore in which the bearing is mounted.

References Cited

UNITED STATES PATENTS

| 710,609 | 10/1902 | Pungs | 308—185 X |
| 713,183 | 11/1902 | Wands | 308—185 X |
| 2,681,836 | 6/1954 | Jarund. | |
| 3,304,133 | 2/1967 | Strassberg. | |
| 2,503,009 | 4/1950 | Thomson. | |
| 2,744,798 | 5/1956 | McCoy. | |
| 3,044,278 | 7/1962 | Geisthoff | 308—201 X |
| 3,157,443 | 11/1964 | Draudt | 308—201 |

FOREIGN PATENTS

| 1,116,656 | 2/1956 | France. |
| 1,350,657 | 12/1964 | France. |
| 701,924 | 1/1954 | Great Britain. |
| 989,955 | 4/1965 | Great Britain. |
| 1,217,407 | 5/1960 | France. |
| 926,119 | 5/1963 | Great Britain. |

MARTIN P. SCHWADRON, Primary Examiner

L. L. JOHNSON, Assistant Examiner